United States Patent
Meng

(10) Patent No.: US 9,948,992 B2
(45) Date of Patent: *Apr. 17, 2018

(54) METHOD AND DEVICE FOR PROVIDING VIDEO OF IPTV SERVICE

(71) Applicant: ZTE Corporation, Shenzhen (CN)

(72) Inventor: Fanzhong Meng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,009

(22) Filed: May 12, 2017

(65) Prior Publication Data

US 2017/0251273 A1    Aug. 31, 2017

Related U.S. Application Data

(63) Continuation of application No. 14/769,347, filed as application No. PCT/CN2013/083643 on Sep. 17, 2013, now Pat. No. 9,654,837.

(30) Foreign Application Priority Data

Feb. 22, 2013  (CN) .......................... 2013 1 0057685

(51) Int. Cl.
*H04N 7/173*     (2011.01)
*H04N 21/61*     (2011.01)
(Continued)

(52) U.S. Cl.
CPC ..... *H04N 21/6125* (2013.01); *H04N 21/4424* (2013.01); *H04N 21/4586* (2013.01);
(Continued)

(58) Field of Classification Search
CPC ........... H04N 21/6125; H04N 21/4424; H04N 21/4586; H04N 21/6175; H04N 21/6375; H04N 21/64322; H04N 21/8456
See application file for complete search history.

(56) References Cited

U.S. PATENT DOCUMENTS 8,103,244 B2    1/2012   Tran et al.
2007/0250863 A1  10/2007  Ferguson
(Continued)

FOREIGN PATENT DOCUMENTS

CN    101378494 A    3/2009
CN    102413364 A    4/2012
(Continued)

OTHER PUBLICATIONS

International Search Report for corresponding application PCT/CN2013/083643 filed Sep. 17, 2013; dated Dec. 19, 2013; pp. 2.

*Primary Examiner* — John Schnurr
(74) *Attorney, Agent, or Firm* — Cantor Colburn LLP

(57) ABSTRACT

Provided are a method and device for providing a video of an Internet Protocol TV or Interactive Personal TV (IPTV) service. The method includes: detecting whether an IPTV service system is accessible for a terminal or not; and when the IPTV system is detected to be inaccessible for the terminal, providing a video for the terminal through a Content Delivery Network (CDN) subsystem. By the technical solution, the technical problems that the user cannot enjoy services such as the video service in case of upgrading, server failure or network failure in the related technology are solved, and live video service can still be provided for the user even though the service of the IPTV service system is inaccessible due to upgrading, server failure or network failure.

20 Claims, 4 Drawing Sheets

(51) Int. Cl.
    *H04N 21/845* (2011.01)
    *H04N 21/6375* (2011.01)
    *H04N 21/442* (2011.01)
    *H04N 21/458* (2011.01)
    *H04N 21/643* (2011.01)

(52) U.S. Cl.
    CPC ..... *H04N 21/6175* (2013.01); *H04N 21/6375* (2013.01); *H04N 21/64322* (2013.01); *H04N 21/8456* (2013.01)

(56) References Cited

U.S. PATENT DOCUMENTS

| | | |
|---|---|---|
| 2009/0116379 A1 | 5/2009 | Rahman |
| 2014/0179266 A1 | 6/2014 | Schultz et al. |

FOREIGN PATENT DOCUMENTS

| | | |
|---|---|---|
| CN | 102833591 A | 12/2012 |
| CN | 102932678 A | 2/2013 |

METHOD AND DEVICE FOR PROVIDING VIDEO OF IPTV SERVICE

CROSS-REFERENCE TO RELATED APPLICATION

This application is a continuation of application Ser. No. 14/769,347, filed Aug. 20, 2015, which is the National Stage of International Application No. PCT/CN2013/083643, filed Sep. 17, 2013, which claims the benefit of Chinese Patent Application No. 201310057685.9, filed Feb. 22, 2013.

TECHNICAL FIELD

The present disclosure relates to the field of network communication, and in particular to a method and a device for providing a video of an Internet Protocol TV or Interactive Personal TV (IPTV) service.

BACKGROUND

At present, IPTV is commercially applied to the global market in a large scale. A Set Top Box (STB) is a generic term for client devices (also referred to as terminals) which provide content services for users. The STB may be embodied as various types of devices or terminals, including traditional devices connected with display devices, such as Personal Computer (PC) or an STB, or user devices installed with multimedia service programs, such as smart phone or Pad. That is, the STB may refer to any type of terminal or device which provides users with multimedia services (sometimes referred to as content service). Content, in this context, could mean any or all of video, audio, Internet web pages, interactive video games, or other possibilities. When services of an IPTV service system become inaccessible due to the upgrading, server failure or network failure, a Set Top Box (STB, or user device or terminal) cannot provide normal TV service for a user. Since the IPTV service is a telecommunication level service, if the services of the IPTV service system become inaccessible, a large scale of users may be greatly influenced. Moreover, a TV service, as the most important recreational activity for ordinary family life particularly in holidays, may be more greatly influenced.

For the above problem in a related technology, there is yet no effective solution.

SUMMARY

For the technical problems that a user cannot enjoy services such alas a video service if the services of an IPTV service system are inaccessible in the related technology, the embodiments of the present disclosure provide a method and device for providing a video of an IPTV service, so as to at least solve the problems.

According to one embodiment of the present disclosure, a method for providing a video of an IPTV service is provided, which includes: detecting whether an IPTV service system is accessible for a terminal or not; and when the IPTV system is detected to be inaccessible for the terminal, providing a video for the terminal through a Content Delivery Network (CDN) subsystem.

In an example embodiment, before providing the video for the terminal through the CDN subsystem, the method includes at least one of: determining that a time difference between a current time point and a last legal login time point of the terminal is smaller than a first threshold value; and determining that a frequency of providing a video for the terminal through the CDN subsystem is smaller than a second threshold value.

In an example embodiment, the method further includes: when the time difference is determined to be smaller than the first threshold value or the frequency is determined to be smaller than the second threshold value, notifying, through the terminal, a user to select a subsequent flow, wherein the subsequent flow includes: providing the video for the terminal through the CDN subsystem, or logging into the IPTV service system again through the terminal.

In an example embodiment, after providing the video for the terminal through the CDN subsystem, the method further includes: acquiring a total length of time for which the CDN subsystem has provided a video for the terminal at present; and when the total length of time is longer than a specified length of time, notifying, through the terminal, the user to log back into the IPTV service system.

In an example embodiment, after providing the video for the terminal through the CDN subsystem, the method further includes: periodically prompting the user to log back into the IPTV service system through the terminal.

In an example embodiment, the method further includes: after the terminal normally logs into the IPTV service system, storing a login time point at which the terminal normally logs into the IPTV service system and a channel playing address currently delivered from the IPTV service system.

In an example embodiment, the terminal may be any terminal for providing content services. The terminal may be embodied as a mobile terminal, such as a smart phone or a pad, and may also be embodied as a fixed terminal, such as a PC or an STB.

According to another embodiment of the present disclosure, a device for providing a video of an IPTV service is provided, which includes: a detection component, configured to detect whether an IPTV service system is accessible for a terminal or not; and a video provision component, configured to, when the IPTV system is detected to be inaccessible for the terminal, provide a video for the terminal through a CDN subsystem.

In an example embodiment, the device includes: a determination component, configured to determine that a time difference between a current time point and a last legal login time point of the terminal is smaller than a first threshold value; and/or determine that a frequency of providing a video for the terminal through the CDN subsystem is smaller than a second threshold value.

In an example embodiment, the device further includes: a first notification component, configured to, when the time difference is determined to be smaller than the first threshold value or the frequency is determined to be smaller than the second threshold value, notify, through the terminal, a user to select a subsequent flow, wherein the subsequent flow includes: providing the video for the terminal through the CDN subsystem, or logging into the IPTV service system again through the terminal.

In an example embodiment, the device further includes: an acquisition component, configured to acquire a total length of time for which the CDN subsystem has provided a video for the terminal at present; and a second notification component, configured to, when the total length of time is longer than a specified length of time, notify the user to log back into the IPTV service system through the terminal.

In an example embodiment, the terminal may be any terminal for providing content services. The terminal may be embodied as a mobile terminal, such as a smart phone or a pad, and may also be embodied as a fixed terminal, such as a PC or an STB.

By virtue of the embodiments of the present disclosure, a video service can be provided for the user through the terminal by virtue of the CDN subsystem when the IPTV service system cannot be accessed normally. The technical problems that the user cannot enjoy services such as the video service in case of upgrading, server failure or network failure in the related technology are solved, and live video service can still be provided for the user even though the service of the IPTV service system is inaccessible due to upgrading, server failure or network failure.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure is described below with reference to the drawings and embodiments in detail. It is important to note that the embodiments in the present disclosure and characteristics in the embodiments can be combined under the condition of no conflicts.

Embodiment 1

Figure 1:
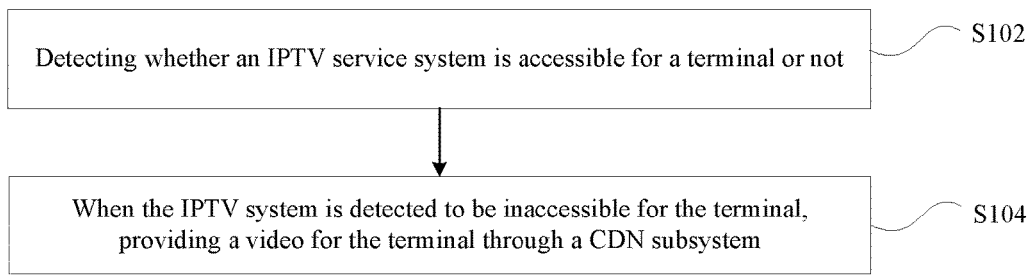
FIG. 1 is a flowchart of a method for providing a video of an IPTV service according to embodiment 1 of the present disclosure.

FIG. 1 is a flowchart of a method for providing a video of an IPTV service according to embodiment 1 of the present disclosure. As shown in FIG. 1, the method includes:

Step S102: it is detected whether an IPTV service system is accessible for a terminal or not; and Step S104: when the IPTV system is detected to be inaccessible for the terminal, a video is provided for the terminal through a CDN subsystem.

By the processing steps, video service can still be provided through the CDN subsystem when the IPTV service system is detected to be inaccessible, so that the technical problems that a user cannot enjoy services such as a video service in case of upgrading, server failure or network failure can be solved, and user experiences are improved.

In the embodiment, before providing the video for the terminal through the CDN subsystem, the method may further include at least one processing of: (1) determining that a time difference between a current time point and a last legal login time point of the terminal is smaller than a first threshold value; and (2) determining that a frequency of providing a video for the terminal through the CDN subsystem is smaller than a second threshold value. In such a manner, the time period and frequency that the user can enjoy the video service can be limited, and the user is prevented from unlimitedly using such an emergency measure. During specific implementation, the processing (1) may be implemented in a manner as follows:

a local service component is provided in the terminal, and a legal service time period of the local service component can be configured, so that basic channel service for the user can be ensured when the IPTV service system cannot provide service.

In the embodiment, when the time difference is determined to be smaller than the first threshold value or the frequency is determined to be smaller than the second threshold value, the user is notified, through the terminal, to select a subsequent flow, wherein the subsequent flow includes: providing the video for the terminal through the CDN subsystem, or logging into the IPTV service system again through the terminal. The step may specifically be implemented in a form as follows:

after the terminal fails to log in the service system (e.g., a main IPTV service system and a standby IPTV service system), the last normal login time point of the user is checked, the user is prompted whether to access the local emergency service or try to log into the service system again if the last normal login time point is within a configured legal time period, otherwise the user is directly prompted whether to access the local emergency service. If the last normal login time point is within the configured legal time period and the user selects to access the local emergency service, the local emergency service is started, otherwise the user is prompted to try to log into the service system again. It is important to note that the local emergency service herein includes, but not limited to, providing the video for the terminal through the CDN subsystem.

After the video is provided for the terminal through the CDN subsystem, a total length of time for which the CDN subsystem has provided a video for the terminal at present may further be acquired; and when the total length of time is longer than a specified length of time, the user is notified to log back into the IPTV service system through the terminal. In the embodiment, after the video is provided for the terminal through the CDN subsystem, the user may further be periodically prompted to log back into the IPTV service system through the terminal. During specific implementation, the processing procedure above may be implemented in a form as follows: after the user selects to access the local emergency service, playing channels are switched through channel switching keys and/or number keys; in a service process of the local emergency service, whether service time period for the user exceeds a configured legal time period or not is periodically checked, and if the service time period exceeds the configured legal time period, the user is prompted to perform login again. In addition, in a channel playing process of the user, the user is periodically prompted, on an interface, to perform login again through a specified key.

In the embodiment, after the terminal normally logs into the IPTV service system, it is necessary to store a login time point at which the terminal normally logs into the IPTV service system and a channel playing address currently delivered from the IPTV service system. In such a manner, some applications may be executed according to the login time point, for example, during a next login, a time period between the stored login time point and a time point for the next login may be calculated according to the stored login time point, and a live video service may be provided for the user according to the channel playing address. The processing procedure may be implemented in a form as follows: after the user normally logs into the system, the terminal records the local successful login time point of the user in a local memory, and records the channel playing address delivered from the service system.

In the above example embodiments, the terminal may be any terminal for providing content services. The terminal may be embodied as a mobile terminal, such as a smart phone or a pad, and may also be embodied as a fixed terminal, such as a PC or an STB.

Figure 2:
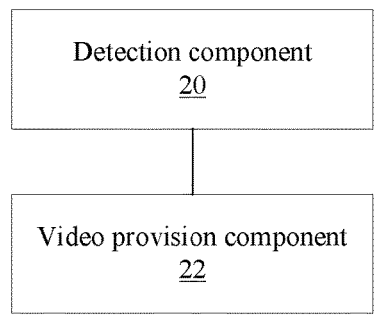
FIG. 2 is a structure diagram of a device for providing a video of an IPTV service according to embodiment 1 of the present disclosure.

The embodiment further provides a device for providing a video of an IPTV service. The device is configured to implement the above-mentioned embodiments and example implementation modes, what has been described will not be repeated here, and components involved in the device are described below. For example, a term "component", used below, is a combination of software and/or hardware capable of realizing preset functions. The device described in the following embodiment is preferably implemented by software, but implementation with hardware or the combination of software and hardware is also possible and conceivable. FIG. 2 is a structure diagram of a device for providing a video of an IPTV service system according to embodiment 1 of the present disclosure. As shown in FIG. 2, the device includes:

a detection component 20, coupled with a video provision component 22 and configured to detect whether an IPTV service system is accessible for a terminal or not; and a video provision component 22, configured to, when the IPTV system is detected to be inaccessible for the terminal, provide a video for the terminal through a CDN subsystem.

By functions realized by each component, video service can still be provided for a user through the CDN subsystem when the IPTV service system is detected to be inaccessible (including a case where the IPTV service system cannot be accessed normally).

Figure 3:
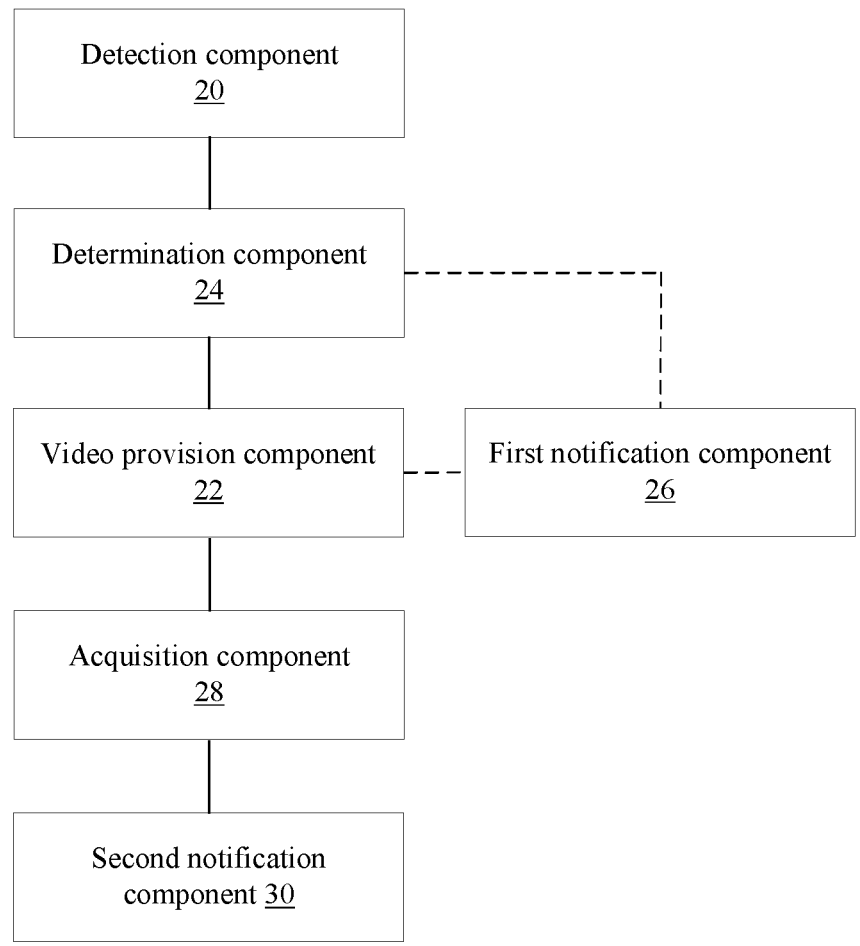
FIG. 3 is another structure diagram of a device for providing a video of an IPTV service according to embodiment 1 of the present disclosure.

In the embodiment, as shown in FIG. 3, the device may further include: a determination component 24, coupled with the video provision component 22 or a first notification component 26 and configured to determine that a time difference between a current time point and a last legal login time point of the terminal is smaller than a first threshold value; and/or determine that a frequency of providing a video for the terminal through the CDN subsystem is smaller than a second threshold value.

It is important to note that, in an example embodiment, when the determination component 24 is coupled with the first notification component 26, it is needed to notify, through the first notification component 26, the user to select a subsequent flow first and then the video provision component 22 provides a video service.

The first notification component 26 is coupled with the video provision component 22, and is configured to, when the time difference is determined to be smaller than the first threshold value or the frequency is determined to be smaller than the second threshold value, notify, through the terminal, the user to select the subsequent flow, wherein the subsequent flow includes: providing the video for the terminal through the CDN subsystem, or logging into the IPTV service system again through the terminal.

In the embodiment, the device may further include: an acquisition component 28, coupled with a second notification component 30 and configured to acquire a total length of time for which the CDN subsystem has provided a video for the terminal at present; and the second notification component 30, configured to, when the total length of time is longer than a specified length of time, notify the user to log back into the IPTV service system through the terminal.

In the above example embodiments, the terminal may be any terminal for providing content services. The terminal may be embodied as a mobile terminal, such as a smart phone or a pad, and may also be embodied as a fixed terminal, such as a PC or an STB.

In order to facilitate better understanding of the embodiments, detailed description is given below with reference to embodiment 2 and the related drawings.

Embodiment 2

A main design idea of this embodiment is that a live video provided by a mature CDN subsystem which is a video provision subsystem of an IPTV service system, particularly a live video provided in a multicast manner or through a live dedicated network, is stable all the time, and a live service may still be provided for a user although the service of the IPTV service system is inaccessible due to upgrading, server failure or network failure. The terminal in the present embodiment may be any terminal for providing content services. The terminal may be embodied as a mobile terminal, such as a smart phone or a pad, and may also be embodied as a fixed terminal, such as a PC or an STB.

The technical solution of the embodiment is implemented as follows.

Figure 4:
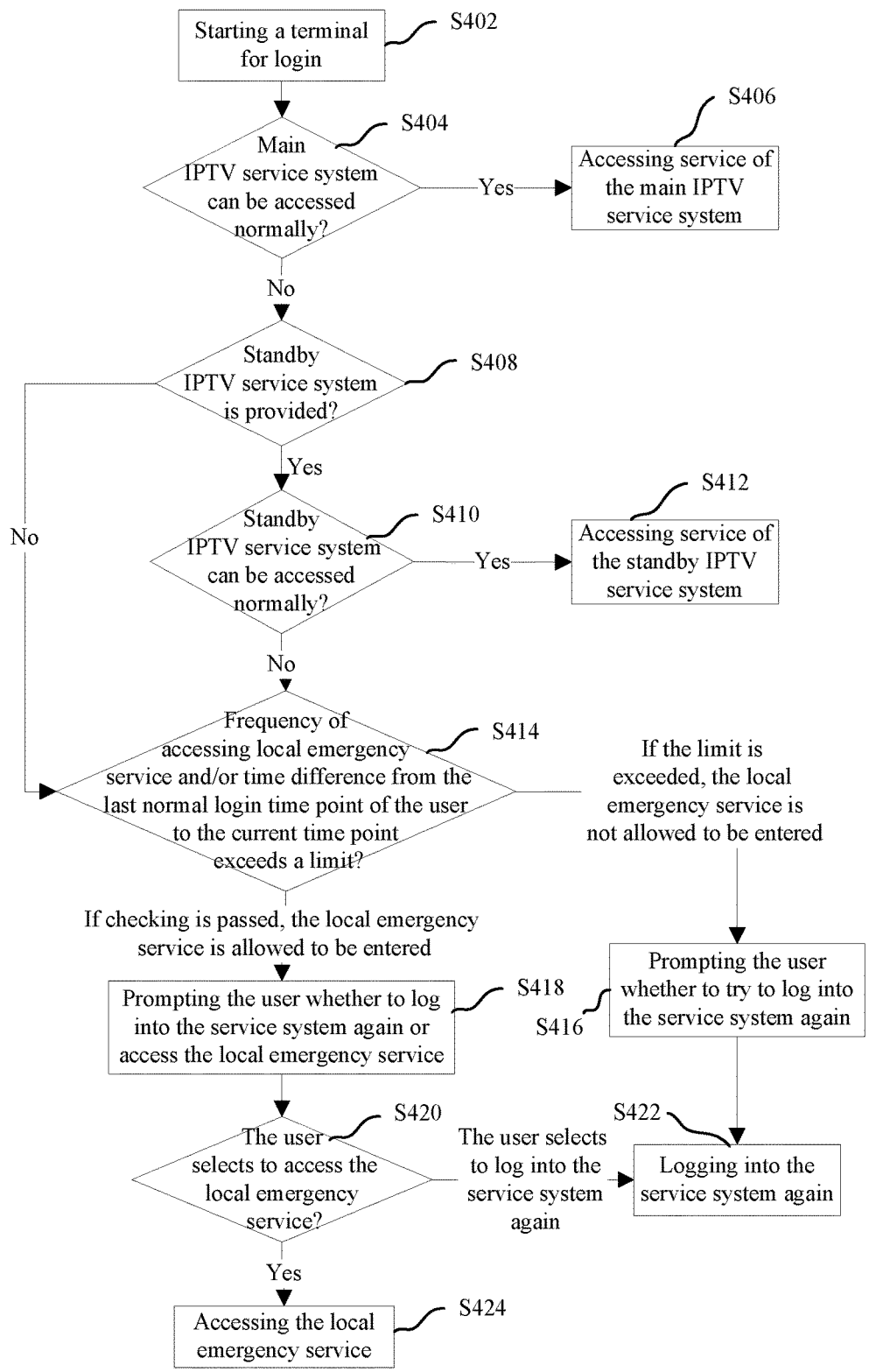
FIG. 4 is a flowchart of accessing a local emergency service during login authentication of a user according to embodiment 2 of the present disclosure.

First of all, a local emergency service component is provided in a terminal version. The local emergency service component is configured to provide a channel playing service when the service of the IPTV service system is inaccessible, and is configured to set check configurations for the use of the local emergency service (a user is prevented from modifying an access address of the IPTV service system through a setting page after normal login), wherein the check configurations may include a configuration about time period within which the local emergency service is accessible after the last legal login, or a configuration about frequency (number of times) of login for the local emergency service when the service of the IPTV service system is inaccessible. Every time when the terminal normally logs into the IPTV service system, the terminal stores successful login time point of the user and a channel playing address delivered in the system. After the terminal fails to log into the service system (e.g., a main IPTV service system and a standby IPTV service system), the last normal login time point of the user or the frequency of using the local emergency service after the last successful login is checked, the user is prompted whether to access the local emergency service or try to log into the service system again if the checking is passed, otherwise the user is directly prompted whether to access the local emergency service. If the checking is passed and the user selects to access the local emergency service, the local emergency service component is started, otherwise the user tries to log into the service system again. As shown in FIG. 4, the processing flow may specifically be implemented by the following processing steps:

Step S402: the terminal is started for login;

Step S404: it is judged whether the main IPTV service system can be normally accessed or not, turn to Step S406 if the main IPTV service system can be normally accessed or not, otherwise turn to Step S408;

Step S406: the terminal accesses the service of the main IPTV service system;

Step S408: it is judged whether a standby IPTV service system is provided or not, turn to Step S410 if the standby IPTV service system is provided, otherwise turn to Step S414;

Step S410: it is judged whether the standby IPTV service system can be accessed normally, turn to Step S412 if the standby IPTV service system can be accessed normally, otherwise turn to step S414;

Step S412: the terminal accesses the service of the standby IPTV service system;

Step S414: it is checked whether frequency of accessing the local emergency service or the time different from the last normal login time point of the user to the current time point exceeds a limit or not, turn to Step S416 if frequency of accessing the local emergency service or the time different from the last normal login time point of the user to the current time point exceeds a limit, otherwise turn to Step S418;

Step S416: the user is prompted whether to try to log into the service system again;

Step S418: the user is prompted whether to log into the service system again or access the local emergency service;

Step S420: it is judged whether the user selects to access the local emergency service or not, turn to Step S424 if the user selects to access the local emergency service or not, otherwise turn to Step S422;

Step S422: log into the service system again; and

Step S424: the terminal accesses the local emergency service.

Figure 5:
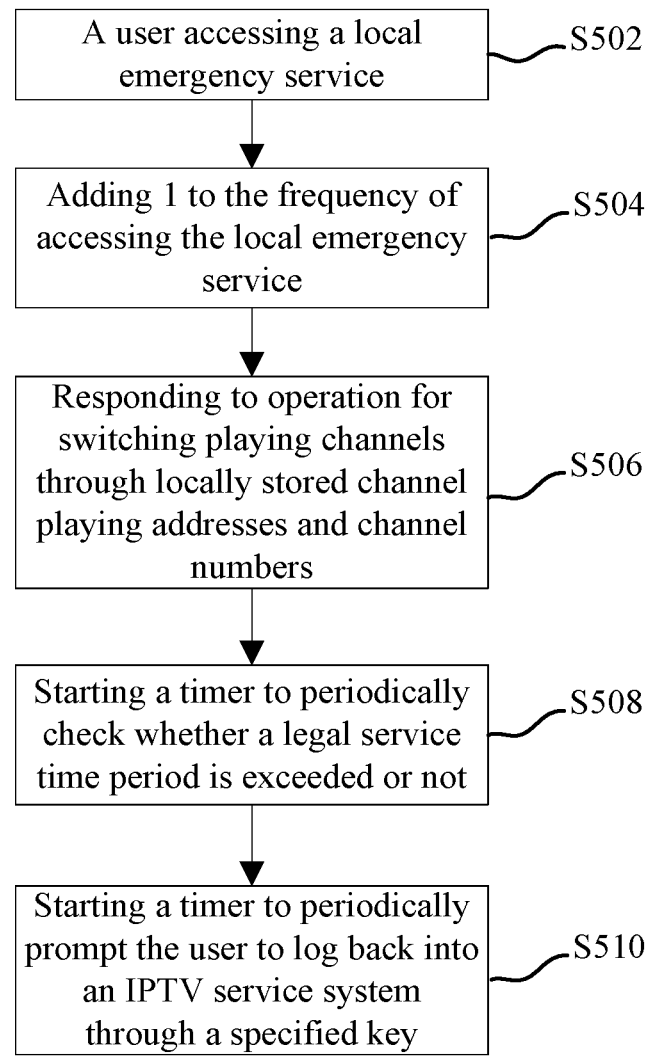
FIG. 5 is a flowchart after accessing the local emergency service according to embodiment 2 of the present disclosure.

After the user selects to access the local emergency service, playing channels may be switched through channel switching keys and/or number keys. In the service process of the local emergency service, whether service time period for the user exceeds a configured legal time period or not is periodically checked, and if the service time period exceeds the configured legal time period, the user is prompted to log back into the service system. In addition, in a channel playing process of the user, the user is periodically prompted, on an interface, to log back into the service system through a specified key. As shown in FIG. 5, the specific flow includes:

Step S502: the user accesses the local emergency service;

Step S504: 1 is added to the frequency of accessing the local emergency service;

Step S506: the operation for switching the playing channels is responded according to locally stored channel playing addresses and channel numbers;

Step S508: a timer is started to periodically check whether the legal service time period is exceeded or not; and Step S510: a timer is started to periodically prompt the user to log back into the IPTV service system through the specified key.

In another embodiment, software is further provided, which is configured to execute the technical solution described in the abovementioned embodiments and example implementation modes.

In another embodiment, a storage medium is further provided, in which the abovementioned software is stored, the storage medium including, but not limited to: a compact disc, floppy disk, a hard disk, an erasable memory and the like.

Obviously, those skilled in the art should know that each component or step of the present disclosure may be implemented by a universal computing device, and the components or steps may be concentrated on a single computing device or distributed on a network formed by multiple computing devices, and may optionally be implemented by programmable codes executable for the computing devices, so that the components or steps may be stored in a storage device for execution with the computing devices, moreover, the shown or described steps may be executed in a sequence different from the sequence here under some conditions, or the components or steps may form each integrated circuit component, or multiple components or steps therein may form a single integrated circuit component for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the claims of the present disclosure.

INDUSTRIAL PRACTICABILITY

The technical solutions provided by the present disclosure may be applied to a video provision process of an IPTV service. A video service is provided for the user through the terminal by virtue of the CDN subsystem when the IPTV service system cannot be accessed normally, so that the technical problems that the user cannot enjoy services such as the video service in case of upgrading, server failure or network failure in the related technology are solved, and live video service can still be provided for the user even though the service of the IPTV service system is inaccessible due to upgrading, server failure or network failure.

What is claimed is:

1. A method for providing a video of an Internet Protocol TV or interactive Personal TV (IPTV) service, comprising:
   detecting whether an IPTV service system is accessible for a terminal or not; and
   when the IPTV system is detected to be inaccessible for the terminal, providing a video for the terminal through a Content Delivery Network (CDN) subsystem;
   wherein after providing the video for the terminal through the CDN subsystem, the method further comprises:
   acquiring a total length of time for which the CDN subsystem has provided a video for the terminal at present; and
   when the total length of time is longer than a specified length of time, notifying, through the terminal, the user to log back into the IPTV service system.

2. The method according to claim 1, wherein before providing the video for the terminal through the CDN subsystem, the method comprises at least one of:
   determining that a time difference between a current time point and a last legal login time point of the terminal is smaller than a first threshold value; and
   determining that a frequency of providing a video for the terminal through the CDN subsystem is smaller than a second threshold value.

3. The method according to claim 2, further comprising:
   when the time difference is determined to be smaller than the first threshold value or the frequency is determined to be smaller than the second threshold value, notifying, through the terminal, a user to select a subsequent flow; wherein the subsequent flow comprises: providing the video for the terminal through the CDN subsystem; or logging into the IPTV service system again through the terminal.

4. The method according to claim 1, wherein after providing the video for the terminal through the CDN subsystem, the method further comprises:
periodically prompting the user to log back into the IPTV service system through the terminal.

5. The method according to claim 2, wherein after providing the video for the terminal through the CDN subsystem; the method further comprises:
periodically prompting the user to log back into the service system through the terminal.

6. The method according to claim 3, wherein after providing the video for the terminal through the CDN subsystem, the method further comprises:
periodically prompting the user to log back into the IPTV service system through the terminal.

7. The method according to claim 1, further comprising:
after the terminal normally logs into the IPTV service system, storing a login time point at which the terminal normally logs into the IPTV service system and a channel playing address currently delivered from the IPTV service system.

8. The method according to claim 2, further comprising:
after the terminal normally logs into the IPTV service system, storing a login time point at which the terminal normally logs into the IPTV service system and a channel playing address currently delivered from the IPTV service system.

9. The method according to claim 3, further comprising:
after the terminal normally logs into the IPTV service system, storing a login time point at which the terminal normally logs into the IPTV service system and a channel playing address currently delivered from the IPTV service system.

10. The method according to claim 1, wherein the terminal comprises a mobile terminal or a fixed terminal, the mobile terminal comprises at least one of a smart phone or a Pad, and the fixed terminal comprises at least one of a Set Top Box (STB) or a Personal Computer (PC).

11. A device for providing a video of an Internet Protocol TV or Interactive Personal TV (IPTV) service, comprising:
a detection component, configured to detect whether an IPTV service system is accessible for a terminal or not; and
a video provision component, configured to, when the IPTV system is detected to be inaccessible for the terminal, provide a video for the terminal through a Content Delivery Network (CDN) subsystem;
further comprising:
an acquisition component, configured to acquire a total length of time for which the CDN subsystem has provided a video for the terminal at present; and
a second notification component, configured to, when the total length of time is longer than a specified length of time, notify the user to log back into the IPTV service system through the terminal.

12. The device according to claim 11; comprising:
a determination component, configured to determine that a time difference between a current time point and a last legal login time point of the terminal is smaller than a first threshold value; and/or determine that a frequency of providing a video for the terminal through the CDN subsystem is smaller than a second threshold value.

13. The device according to claim 12, further comprising:
a first notification component, configured to, when the time difference is determined to be smaller than the first threshold value or the frequency is determined to be smaller than the second threshold value, notify, through the terminal, a user to select a subsequent flow, wherein the subsequent flow comprises: providing the video for the terminal through the CDN subsystem, or logging into the IPTV service system again through the terminal.

14. The device according to claim 11, wherein the device is further configured to, after the video provision component provides the video for the terminal through the CDN subsystem, periodically prompt the user to log back into the WIN service system through the terminal.

15. The device according to claim 12; wherein the device is further configured to, after the video provision component provides the video for the terminal through the CDN subsystem, periodically prompt the user to log back into the IPTV service system through the terminal.

16. The device according to claim 13, wherein the device is further configured to; after the video provision component provides the video for the terminal through the CDN subsystem, periodically prompt the user to log back into the IPTV service system through the terminal.

17. The device according to claim 11, wherein the device is further configured to, after the terminal normally logs into the IPTV service system, store a login time point at which the terminal normally logs into the IPTV service system and a channel playing address currently delivered from the IPTV service system.

18. The device according to claim 12, wherein the device is further configured to, after the terminal normally logs into the IPTV service system, store a login time point at which the terminal normally logs into the IPTV service system and a channel playing address currently delivered from the IPTV service system.

19. The device according to claim 13, wherein the device is further configured to, after the terminal normally logs into the IPTV service system, store a login time point at which the terminal normally logs into the IPTV service system and a channel playing address currently delivered from the IPTV service system.

20. The device according to claim 11, wherein the terminal comprises a mobile terminal or a fixed terminal, the mobile terminal comprises at least one of a smart phone or a Pad, and the fixed terminal comprises at least one of a Set Top Box (STB) or a Personal Computer (PC).

* * * * *